US012658991B2

(12) United States Patent
Chiu

(10) Patent No.: US 12,658,991 B2
(45) Date of Patent: Jun. 16, 2026

(54) ELECTRONIC DEVICE AND EXTERNAL ANTENNA SWITCHING METHOD THEREOF

(71) Applicant: Getac Technology Corporation, New Taipei City (TW)

(72) Inventor: Shang-Ming Chiu, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 0 days.

(21) Appl. No.: 18/749,687

(22) Filed: Jun. 21, 2024

(65) Prior Publication Data

US 2025/0141506 A1 May 1, 2025

(30) Foreign Application Priority Data

Nov. 1, 2023 (CN) .......................... 202311448062.4

(51) Int. Cl.
*H04B 7/06* (2006.01)
(52) U.S. Cl.
CPC .................................. *H04B 7/0602* (2013.01)
(58) Field of Classification Search
CPC ........ H04B 1/18; H04B 1/401; H04B 1/0458; H04B 7/0602; H04B 7/0608; H01Q 1/2266; H01Q 1/3233; H01Q 3/24; H01Q 21/28
See application file for complete search history.

(56) References Cited

U.S. PATENT DOCUMENTS

| | | | | |
|---|---|---|---|---|
| 7,945,214 | B2 * | 5/2011 | Kim ..................... | H04B 7/0608 |
| | | | | 455/562.1 |
| 8,064,960 | B2 * | 11/2011 | Wisnewski .......... | H01Q 1/3208 |
| | | | | 455/562.1 |
| 11,063,622 | B2 * | 7/2021 | Roe ......................... | H04B 1/006 |
| 2009/0295648 | A1 * | 12/2009 | Dorsey .................. | H01Q 21/28 |
| | | | | 343/702 |
| 2011/0287820 | A1 | 11/2011 | Harrison et al. | |
| 2013/0308554 | A1 * | 11/2013 | Ngai ........................ | H04B 1/44 |
| | | | | 370/329 |

FOREIGN PATENT DOCUMENTS

| | | |
|---|---|---|
| CN | 102790638 A | 11/2012 |
| CN | 111710978 A | 9/2020 |
| EP | 3054603 A1 | 8/2016 |
| TW | 200406082 A | 4/2004 |
| TW | M391733 U1 | 11/2010 |
| TW | 201332215 A | 8/2013 |
| TW | M575926 U | 3/2019 |
| TW | M635680 U | 12/2022 |

* cited by examiner

*Primary Examiner* — Tung X Le
(74) *Attorney, Agent, or Firm* — Cooper Legal Group, LLC

(57) ABSTRACT

Disclosed are an electronic device and an external antenna switching method. The external antenna switching method is applicable to an electronic device including an external antenna group, a detection module, and a switching module, where the external antenna group includes a plurality of external antennas and a plurality of power supply loops. The external antenna switching method includes: detecting, by the detection module, an enable signal of the external antenna group; and enabling, by the switching module, the plurality of external antennas according to the plurality of power supply loops when the detection module detects the enable signal.

8 Claims, 2 Drawing Sheets

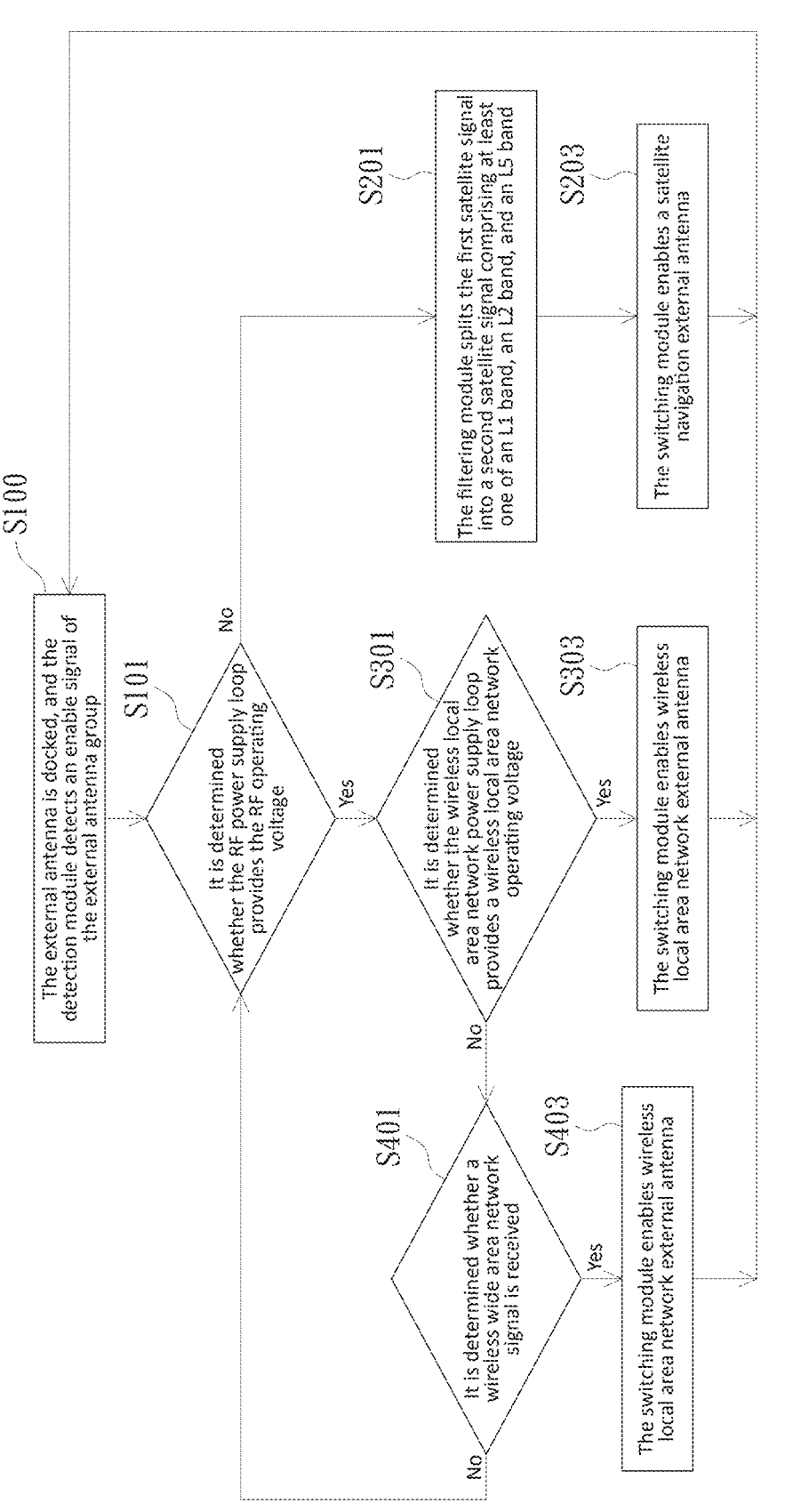

The external antenna is docked, and the detection module detects an enable signal of the external antenna group

S101

It is determined whether the RF power supply loop provides the RF operating voltage No →

Yes ↓

S201

The filtering module splits the first satellite signal into a second satellite signal comprising at least one of an L1 band, an L2 band, and an L5 band

S203

The switching module enables a satellite navigation external antenna

S301

It is determined whether the wireless local area network power supply loop provides a wireless local area network operating voltage Yes →

S303

The switching module enables wireless local area network external antenna

No ↓

S401

It is determined whether a wireless wide area network signal is received

Yes →

S403

The switching module enables wireless local area network external antenna

No

ELECTRONIC DEVICE AND EXTERNAL ANTENNA SWITCHING METHOD THEREOF

CROSS-REFERENCE TO RELATED PATENT APPLICATION

This application claims the benefit of priority to the China Patent Application No. 202311448062.4, filed on Nov. 1, 2023. The entire content of the China Patent Application No. 202311448062.4 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present invention relates to an electronic device and an external antenna switching method, in particular to an external antenna switching method for switching to a specific external antenna according to power loops of an external antenna group when the electronic device detects the docking of the external antenna.

BACKGROUND OF THE INVENTION

In order to enable an electronic device to acquire a wireless signal with better signal strength/quality, a plurality of antennas may be configured in the electronic device.

However, due to the location of antennas in the electronic device, an environmental parameter, or a circuit configuration, etc., the signal strength and quality received by each antenna are different, and the electronic device needs to select a corresponding wireless signal according to the current situation.

Furthermore, when an external antenna is docked (i.e., a wireless signal corresponding to the external antenna is received), the electronic device would need to identify the wireless signal, and then enable the corresponding external antenna to receive the wireless signal corresponding to the external antenna of the wireless signal type.

However, the identification of wireless signals is often tedious and slow, and at present there is a lack of a technical flow/architecture that can quickly identify and switch to an external antenna for a particular type of wireless signal.

SUMMARY OF THE INVENTION

In view of the above, the present invention provides an electronic device, and an external antenna switching method, wherein the external antenna switching method is applicable to the electronic device. In the external antenna switching method according to the present invention, the electronic device may detect an enable signal of the external antenna group by a detection module, and when the detection module detects the enable signal, the switching module may enable the corresponding external antenna according to the power supply loop. Thereby, the electronic device of the present invention can quickly recognize the kind of wireless signal when the external antenna is docked, and switch the antenna to the external antenna corresponding to the wireless signal to receive a specific kind of wireless signal.

The external antenna switching method provided by the present invention is applicable to an electronic device including an external antenna group, a detection module, and a switching module, where the external antenna group includes a plurality of external antennas and a plurality of power supply loops, and the external antenna switching method includes: detecting, by the detection module, an enable signal of the external antenna group; enabling, by the switching module, the plurality of external antennas according to the plurality of power supply loops when the detection module detects the enable signal.

In an embodiment of the present invention, in the above-mentioned external antenna switching method, the external antenna includes: a radio frequency external antenna for receiving a radio frequency signal; and a satellite navigation external antenna for receiving a first satellite signal; wherein the power supply loop includes: a radio frequency power supply loop connected to the radio frequency external antenna for providing a radio frequency operating voltage for the radio frequency external antenna; and the external antenna switching method includes: enabling, by the switching module, the satellite navigation external antenna according to the radio frequency operating voltage.

In an embodiment of the present invention, in the above-mentioned external antenna switching method, the electronic device includes a filtering module, and the external antenna switching method includes: splitting, by the filtering module, the first satellite signal into a second satellite signal comprising at least one of an L1 frequency band, an L2 frequency band, and an L5 frequency band.

In an embodiment of the present invention, according to the above-mentioned external antenna switching method, the external antenna includes: a wireless local area network external antenna for receiving a wireless local area network signal; wherein the power supply loop includes: a wireless local area network power supply loop for providing a wireless local area network operating voltage for an external antenna of the wireless local area network; and the external antenna switching method includes: enabling, by the switching module, the wireless local area network external antenna according to the radio frequency operating voltage and the operating voltage for the wireless local area network.

In an embodiment of the present invention, in the above-mentioned external antenna switching method, the external antenna includes: a wireless wide area network external antenna for receiving a wireless wide area network signal; wherein the external antenna switching method includes: enabling, by the switching module, the wireless wide area network external antenna according to the radio frequency operating voltage, the wireless local area network operating voltage, and the wireless wide area network signal.

The present invention provides an electronic device comprising: an external antenna group comprising a plurality of external antennas and a plurality of power supply loops; a detection module connected to the external antenna group for detecting an enable signal of the external antenna group; a switching module connected to the external antenna group to enable the plurality of external antennas; and a processing module, a connection detection module and a switching module for executing an external antenna switching method; wherein the external antenna switching method includes: detecting, by the detection module, an enable signal of the external antenna group; enabling, by the switching module, the plurality of external antennas according to the plurality of power supply loops when the detection module detects the enable signal.

In an embodiment of the present invention, in the electronic device described above, the external antenna includes: a radio frequency external antenna for receiving a radio frequency signal; and a satellite navigation external antenna for receiving a first satellite signal; wherein the power supply loop includes: a radio frequency power supply loop connected to the radio frequency external antenna for providing a radio frequency operating voltage for the radio frequency external antenna; and the external antenna switching method includes: enabling, by the switching module, the satellite navigation external antenna according to the radio frequency operating voltage.

In an embodiment of the present invention, the electronic device further includes a filtering module, wherein the filtering module is connected to a satellite navigation external antenna; wherein the external antenna switching method includes: splitting, by the filtering module, the first satellite signal into a second satellite signal including at least one of an L1 frequency band, an L2 frequency band, and an L5 frequency band.

In an embodiment of the present invention, in the electronic device described above, the external antenna includes: a wireless local area network external antenna for receiving a wireless local area network signal; wherein the power supply loop includes: a wireless local area network power supply loop for providing a wireless local area network operating voltage for an external antenna of the wireless local area network; and the external antenna switching method includes: enabling, by the switching module, the wireless local area network external antenna according to the radio frequency operating voltage and the operating voltage for the wireless local area network.

In an embodiment of the present invention, in the above-mentioned electronic device, the external antenna includes: a wireless wide area network external antenna for receiving a wireless wide area network signal; wherein the external antenna switching method includes: enabling, by the switching module, the wireless wide area network external antenna according to the radio frequency operating voltage, the wireless local area network operating voltage, and the wireless wide area network signal.

In summary, in the external antenna switching method according to the present invention, the electronic device may detect an enable signal of the external antenna group by a detection module, and when the detection module detects the enable signal, the switching module may enable the corresponding external antenna according to the power supply loop. Thereby, when the external antenna is docked, the electronic device of the present invention can quickly recognize the kind of wireless signal by the external antenna switching method provided by the present invention and switch the antenna to the external antenna corresponding to the wireless signal.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 is a flowchart of the steps of an external antenna switching method according to an embodiment of the present invention.

DETAILED DESCRIPTION OF PREFERRED EMBODIMENTS

Figure 1:
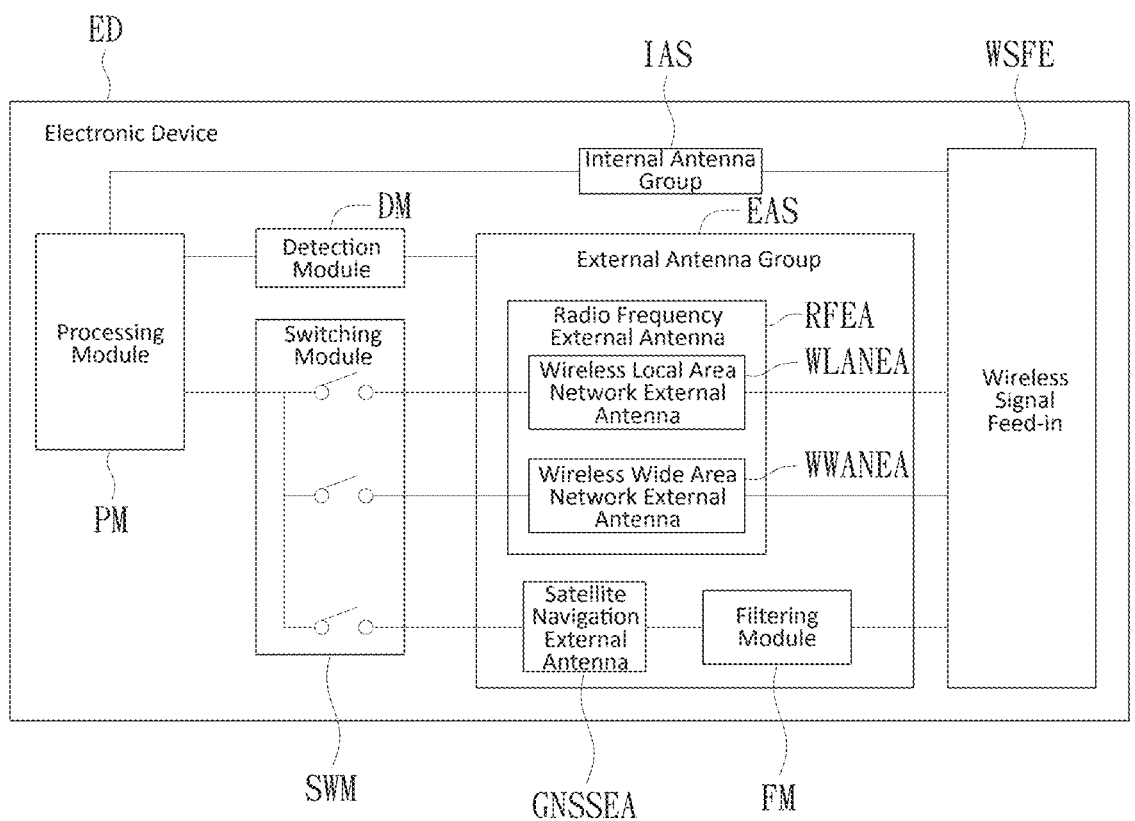
FIG. 1 is a block diagram of an electronic device provided according to an embodiment of the present invention.

Reference is made to FIG. 1, which is a block diagram of an electronic device ED provided according to an embodiment of the present invention. The following will be described for the hardware architecture of the present invention.

In this embodiment, the electronic device ED of the present invention includes: a processing module PM, a switching module SWM, a detection module DM, an external antenna group EAS, an internal antenna group IAS, and a wireless signal feed-in WSFE. The external antenna group EAS includes a plurality of external antennas, a plurality of power supply loops (not shown) corresponding to the external antennas, and a filtering module FM, wherein the external antennas include: a radio frequency external antenna RFEA and a satellite navigation external antenna GNSSEA; the radio frequency external antenna RFEA is used for receiving a radio frequency signal and includes: a wireless local area network external antenna WLANEA, and a wireless wide area network external antenna WWANEA.

The external antennas may each have a power supply loop. For instance, the radio frequency external antenna RFEA can have a corresponding radio frequency power supply loop, and the radio frequency power supply loop is connected to the radio frequency external antenna RFEA and provides a radio frequency operating voltage for the radio frequency external antenna RFEA. For instance, the wireless local area network external antenna WLANEA can receive a wireless local area network signal and can have a corresponding wireless local area network power supply loop, wherein the wireless local area network power supply loop is connected to the wireless local area network external antenna WLANEA and provides a wireless local area network operating voltage for the wireless local area network external antenna WLANEA. For instance, the wireless wide area network external antenna WWANEA can receive a wireless wide area network signal, and can have a corresponding wireless wide area network power supply loop, wherein the wireless wide area network power supply loop is connected to the wireless wide area network external antenna WLANEA and provides a wireless wide area network operating voltage for the wireless wide area network external antenna WWANEA. For instance, the satellite navigation external antenna GNSSEA can receive a first satellite signal, and may have a corresponding satellite navigation power supply loop, wherein the satellite navigation power supply loop is connected to the satellite navigation external antenna GNSSEA and provides a satellite navigation operating voltage for the satellite navigation external antenna GNSSEA.

The processing module PM is coupled to an internal antenna group IAS, an external antenna group EAS and a plurality of power supply loops (not shown) of the external antenna group EAS, and is connected to the switching module SWM and the detection module DM; the external antenna group EAS is connected to the detection module DM; the switching module SWM is connected to a wireless local area network external antenna WLANEA, a wireless wide area network external antenna WWANEA and a satellite navigation external antenna GNSSEA; the filtering module FM is connected to a satellite navigation external antenna GNSSEA and a wireless signal feed-in WSFE; the wireless signal feed-in WSFE is connected to an internal antenna group IAS, a wireless local area network external antenna WLANEA, a wireless wide area network external antenna WWANEA, and a filtering module FM.

In this embodiment, for instance, the electronic device ED of the present invention can receive a wireless signal by means of the internal antenna group IAS before docking the external antenna and can execute an external antenna switching method by means of the processing module PU, so that the detection module DM detects an enable signal of the external antenna group EAS, and when the detection module DM detects the enable signal (i.e., when docking the external antenna, the docking of the external antenna can be manually switched, or automatically switched after being determined by software/firmware), the processing module PU can transmit a switching signal to the switching module SWM so that the switching module SWM can enable a corresponding external antenna according to the operating voltages provided by a plurality of power supply loops of the external antenna group EAS. Thereby, the electronic device ED of the present invention enables the electronic device ED to quickly recognize the kind of wireless signal and switch the antenna to the external antenna corresponding to the wireless signal when the external antenna is docked by the external antenna switching method provided by the present invention.

In this embodiment, the internal antenna group IAS and the external antenna group EAS of the present invention may respectively include a plurality of antennas that may respectively receive wireless signals of different frequency bands, and feed the plurality of wireless signals of different frequency bands to the wireless signal feed-in WSFE, so that the electronic device ED may selectively feed the wireless signals of different frequency bands to the wireless signal feed-in WSFE via the switching module SWM (for example, the wireless signal to be fed may be manually selected, or the wireless signal to be fed may be automatically selected via software/firmware determination). For instance, the satellite navigation external antenna GNSSEA can be used to receive a first satellite signal including a satellite signal frequency band (for example, the satellite signal includes an L1 frequency band, an L2 frequency band, and/or an L5 frequency band), the radio frequency external antenna RFEA can be used to receive a radio frequency external signal including a radio frequency band, and wherein the wireless local area network external antenna WLANEA can be used to receive a wireless local area network signal, and the wireless wide area network external antenna WWANEA can be used to receive a wireless wide area network signal.

For instance, the internal antenna group IAS may be configured inside the electronic device ED at the configuration positions of the internal antenna group IAS and the external antenna group EAS, and the external antenna group EAS may be configured at a position closer to an outer surface of the electronic device ED than the internal antenna group IAS or at a surface of the electronic device ED. In an embodiment, the external antenna group EAS is an external antenna group detachably connectable to the electronic device ED.

In this embodiment, the detection module DM of the present invention can detect the enable signal of the external antenna group EAS. For instance, when the external antenna group EAS is docked (enabled), part of the circuit in the external antenna group EAS may generate a voltage change as the external antenna group EAS is docked, and the voltage change may be an instantaneous pulse signal or a change in a steady-state voltage logic level, wherein the operating voltage provided by the power supply loop may be one embodiment of the enable signal. When the detection module DM detects an enable signal, the processing module PM may transmit a switching signal to the switching module SWM according to the enable signal, and enable the switching module SWM to enable the corresponding external antenna according to the power supply loop of the external antenna group EAS.

In this embodiment, the filtering module FM of the present invention is connected to the satellite navigation external antenna GNSSEA and performs filtering processing to split a first satellite signal received by the satellite navigation external antenna GNSSEA into a second satellite signal including at least one of an L1 frequency band, an L2 frequency band, and an L5 frequency band, and then transmits the second satellite signal to the wireless signal feed-in WSFE. Thereby, since the filtering module FM of the present invention can split a satellite signal including a plurality of frequency bands after the satellite navigation external antenna GNSSEA receives the signal, the filtering module FM can make the feeding of the satellite signal more selective and achieve the technical effect of reducing the number of antennas (the satellite navigation external antenna GNSSEA can receive a satellite signal including a plurality of frequency bands and does not need to configure a plurality of antennas corresponding to a plurality of frequency bands).

Reference is now made to FIG. 2, which is a flow chart illustrating the steps of an external antenna switching method according to an embodiment of the present invention. The following will be described below for the method/process of the present invention.

In this embodiment, the processing module PM of the electronic device ED may perform the external antenna switching method of FIG. 2, wherein the steps of the external antenna switching method include:

Step S100: an external antenna is docked, a detection module DM detects an enable signal of an external antenna group EAS, and the method goes to step S101. For instance, a default state of the electronic device ED may be receiving a wireless signal with an internal antenna group IAS, the detection module DM may detect an enable signal of an external antenna group EAS, and when the external antenna is docked, the detection module DM may detect an enable signal (such as a voltage change) of the external antenna group EAS, and start a flow to determine the type of the docked wireless signal.

Step S101: it is determined whether a radio frequency power supply loop provides a radio frequency operating voltage, and when the determination result is YES, the method goes to step S301, and when the determination result is NO, the method goes to step S201; the processing unit PM may determine whether the radio frequency power supply loop provides a radio frequency operating voltage, preliminarily determine the type of the wireless signal to be docked based on the radio frequency operating voltage, determine that the wireless signal to be docked is a satellite signal when the determination result is NO, and the method goes to step S301 to further determine the type of the wireless signal to be docked when the determination result is YES.

Step S201: the filtering module FM splits the first satellite signal into a second satellite signal including at least one of an L1 frequency band, an L2 frequency band, and an L5 frequency band, and the method goes to step S203; after determining that the docked wireless signal is a satellite signal, the filtering module FM may perform filtering processing on the first satellite signal to split the first satellite signal into a second satellite signal including at least one of an L1 frequency band, an L2 frequency band, and an L5 frequency band.

Step S203: the switching module SWM enables the satellite navigation external antenna GNSSEA, and the method goes to step S100 when the next dock of the external antenna is detected; the processing unit PM may transmit a switching signal to the switching module SWM and enable the satellite navigation external antenna GNSSEA according to the radio frequency operating voltage (i.e. enable/switch to the satellite navigation external antenna GNSSEA after a preliminary determination whether the radio frequency operating voltage is provided via the radio frequency power supply loop).

Step S301: it is determined whether a wireless local area network power supply loop provides a wireless local area network operating voltage; when the processing unit PM determines that the radio frequency power supply loop provides the radio frequency operating voltage, the processing unit PM may further determine whether the wireless local area network power supply loop provides the wireless local area network operating voltage, and when the determination result is YES, the method goes to step S303, and when the determination result is NO, the method goes to step S401.

Step S303: the switching module SWM enables the wireless local area network external antenna WLANEA, and the method goes to step S100 when detecting the next external antenna dock; after determining whether the radio frequency operating voltage and the wireless local area network operating voltage are provided, the processing unit PM can transmit a switching signal to the switching module SWM, and the switching module SWM enables the wireless local area network external antenna WLANEA (enables/switches to the wireless local area network external antenna WLANEA) according to the radio frequency operating voltage and the wireless local area network operating voltage.

Step S401: it is determined whether a wireless wide area network signal is received; return to step S101 when the determination result is NO to determine again whether the radio frequency power supply loop provides the radio frequency operating voltage; and the method goes to step S403 when the determination result is NO.

Step S403: the switching module SWM enables the wireless wide area network external antenna WWANEA, and the method goes to step S100 when the next external antenna dock is detected; after the determination of whether to provide the radio frequency operating voltage and the operating voltage for the wireless local area network and the determination of whether to receive the wireless wide area network signal, the processing unit PM can transmit the switching signal to the switching module SWM, i.e., the switching module SWM enables the wireless wide area network external antenna WWANEA (enables/switches to the wireless wide area network external antenna WWANEA) according to the radio frequency operating voltage, the operating voltage for the wireless local area network, and the wireless wide area network signal.

In summary, according to the external antenna switching method provided by the present invention, the electronic device can detect an enable signal of the external antenna group by the detection module, and when the detection module detects the enable signal, the switching module can enable the corresponding external antenna according to the power supply loop of the external antenna group. Thereby, when the external antenna is docked, the electronic device of the present invention can quickly recognize the kind of wireless signal by the external antenna switching method provided by the present invention and switch the antenna to the external antenna corresponding to the wireless signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An external antenna switching method, applicable to an electronic device comprising an external antenna group, a detection module, and a switching module, wherein the external antenna group comprises a plurality of external antennas and a plurality of power supply loops, and the external antenna switching method comprises:

detecting, by the detection module, an enable signal of the external antenna group; and enabling, by the switching module, the plurality of external antennas according to the plurality of power supply loops when the detection module detects the enable signal;

wherein the plurality of external antennas comprise:

an external radio frequency antenna for receiving a radio frequency signal; and an external satellite navigation antenna for receiving a first satellite signal;

wherein the plurality of power supply loops comprise:

a radio frequency power supply loop connected to the external radio frequency antenna for providing a radio frequency operating voltage for the external radio frequency antenna;

wherein the external antenna switching method further comprises:

enabling, by the switching module, the external satellite navigation antenna according to the radio frequency operating voltage.

2. The external antenna switching method according to claim 1, wherein the electronic device comprises a filtering module, and the external antenna switching method further comprises:

splitting, by the filtering module, the first satellite signal into a second satellite signal comprising at least one of an L1 band, an L2 band, or an L5 band.

3. The external antenna switching method according to claim 1, wherein the plurality of external antennas comprise:

an external wireless local area network antenna for receiving a wireless local area network signal;

wherein the plurality of power supply loops comprise:

a wireless local area network power supply loop for providing a wireless local area network operating voltage for the external wireless local area network antenna;

wherein the external antenna switching method further comprises:

enabling, by the switching module, the external wireless local area network antenna according to the radio frequency operating voltage and the wireless local area network operating voltage.

4. The external antenna switching method according to claim 3, wherein the plurality of external antennas comprise:

an external wireless wide area network antenna for receiving a wireless wide area network signal;

wherein the external antenna switching method further comprises:

enabling, by the switching module, the external wireless wide area network antenna according to the radio frequency operating voltage, the wireless local area network operating voltage, and the wireless wide area network signal.

5. An electronic device, comprising:

an external antenna group, comprising a plurality of external antennas and a plurality of power supply loops;

a detection module, connected to the external antenna group for detecting an enable signal of the external antenna group;

a switching module, connecting the external antenna group to enable the plurality of external antennas; and a processing module, connected to the detection module and the switching module for executing an external antenna switching method;

wherein the external antenna switching method comprises:

detecting, by the detection module, the enable signal of the external antenna group; and enabling, by the switching module, the plurality of external antennas according to the plurality of power supply loops when the detection module detects the enable signal;

wherein the plurality of external antennas comprise:

an external radio frequency antenna for receiving a radio frequency signal; and an external satellite navigation antenna for receiving a first satellite signal;

wherein the plurality of power supply loops comprise:

a radio frequency power supply loop connected to the external radio frequency antenna for providing a radio frequency operating voltage for the external radio frequency antenna;

wherein the external antenna switching method further comprises:

enabling, by the switching module, the external satellite navigation antenna according to the radio frequency operating voltage.

6. The electronic device according to claim 5, wherein the electronic device further comprises a filtering module connected to the external satellite navigation antenna;

wherein the external antenna switching method further comprises:

splitting, by the filtering module, the first satellite signal into a second satellite signal comprising at least one of an L1 band, an L2 band, or an L5 band.

7. The electronic device according to claim 5, wherein the plurality of external antennas comprise:

an external wireless local area network antenna for receiving a wireless local area network signal;

wherein the plurality of power supply loops comprise:

a wireless local area network power supply loop for providing a wireless local area network operating voltage for the external wireless local area network antenna;

wherein the external antenna switching method further comprises:

enabling, by the switching module, the external wireless local area network antenna according to the radio frequency operating voltage and the wireless local area network operating voltage.

8. The electronic device according to claim 7, wherein the plurality of external antennas comprise:

an external wireless wide area network antenna for receiving a wireless wide area network signal;

wherein the external antenna switching method further comprises:

enabling, by the switching module, the external wireless wide area network antenna according to the radio frequency operating voltage, the wireless local area network operating voltage, and the wireless wide area network signal.

* * * * *